April 7, 1964 W. L. HENDRIX Re. 25,549

METHOD OF STRINGING CABLE

Original Filed Aug. 25, 1958

Inventor
William L. Hendrix
by Roberts, Cushman & Grover
Attys

United States Patent Office

Re. 25,549
Reissued Apr. 7, 1964

25,549
METHOD OF STRINGING CABLE

William L. Hendrix, Amherst, N.H.

Original No. 2,983,037, dated May 9, 1961, Ser. No. 756,767, Aug. 25, 1958. Application for reissue Nov. 20, 1962, Ser. No. 239,417
6 Claims. (Cl. 254—134.3)

Matter enclosed in heavy brackets [ ] appears in the original patent but forms no part of this reissue specification; matter printed in italics indicates the additions made by reissue.

This invention relates to the overhead installation of cables which are to be supported intermediate line poles or other overhead means by hanger clamps suspended from a tensioned messenger cable strung between said overhead means, and more particularly to a method of stringing said messenger-supported cables.

It has been customary in stringing messenger-supported cables to employ pulley-supporting frames suspended from said messenger at the prospective locations of permanent cable hanger clamps for initially receiving the cables as they are strung along said messenger. Utilization of such temporary pulleys facilitates stringing of cables and permits uniform tensioning of a plurality of cables from either end thereof over comparatively long installation lengths, the sag between successive frame pulleys being proportional to pulley spacing. Thereafter, cable hanger clamps may be suspended from the messenger adjacent said pulleys to receive and permanently support the cables as tensioned and sagged. This method of cable installation, however, requires that each temporary pulley-supporting frame be individually spaced at desired intervals along said messenger and that cables to be installed be individually strung over each frame pulley as positioned.

Objects of the invention are to provide a method of cable construction, with pulley blocks traveling on a messenger wire, which facilitates the stringing of cables, which keeps phase conductors in the same relative position while stringing, which prevents entanglements during the stringing procedure, which permits stringing tensions so low that the payoff reels need not be braked, thus eliminating the need of reel attendance, which facilitates uniform tensioning in long installations, which reduces the time, labor and expense of cable installation, and which prevents the conductors from sagging excessively between pulley blocks, the latter being especially helpful in avoiding trees, other electrical lines, and street traffic.

Other objects and advantages will appear in the following more detailed description which illustrates the cable stringing method of this invention as applied to a particular cable installation and in which FIG. 1 is a partial side elevation of a cable line showing the cables and pulley-supporting frames in position to be simultaneously strung along the messenger;

Figure 1:
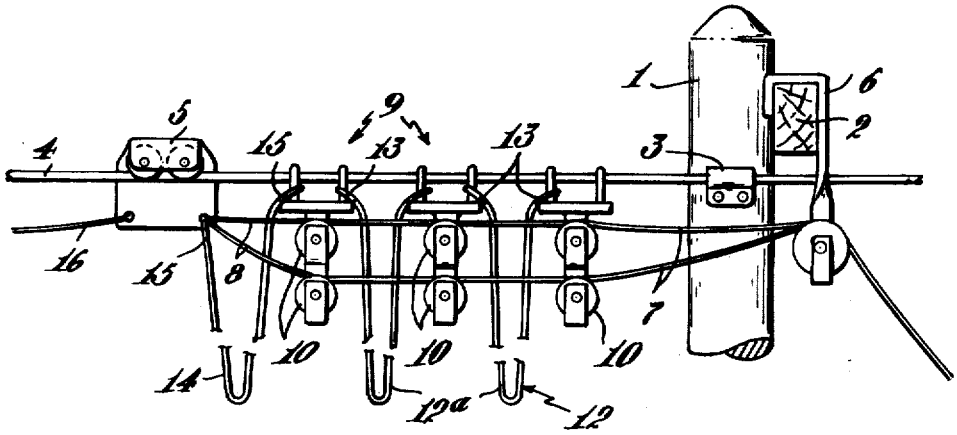

In the drawings, 1 indicates a line pole having a crosspiece 2 and a messenger clamp 3 affixed thereto, said clamp supporting a tensioned messenger cable 4 in overhead position. A line pole is shown here supporting a messenger 4 by means of the clamp 3, but said pole and clamp are no part of this invention, any overhead means supporting a messenger being contemplated. Throughout the remainder of this application, the line poles 1 in each figure of the drawing will be referred to as "first" or "second" counting from right to left, and "forward" will mean to the left of any reference point in the drawing figures.

In the method of cable installation provided by this invention, a messenger trolley 5 is placed on the messenger 4 forward of but closely adjacent the first line pole, and individual snatch blocks 6 are attached to the crosspiece 2 or otherwise suitably affixed to the pole, one block being attached for each cable 7 to be installed. The blocks should be suspended relatively near the messenger 4 to serve as fixed guides for cables 7 to be strung along the messenger. The lead end 8 of each cable is then lifted from reels (not shown) disposed near the base of said first line pole, is fed through the snatch block 6 adapted to receive it, and is attached to the rear of the messenger trolley 5.

Figure 4:
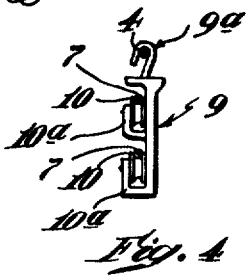
FIG. 4 is a front elevation of the pulley-supporting frame showing means for slidably attaching said frame to the messenger.

A sequence of pulley-supporting frames 9 are then slidably attached to the messenger between the trolley 5 and said first pole (see FIG. 1), said trolley being pushed forward on the messenger, if necessary, to accommodate the frames, and each cable 7 attached to the trolley is laid over a matching pulley 10 of each frame in said sequence. It should be noted that if the rearward pulley-supporting frame 9 in said sequence is connected to the first pole, the pulleys 10 of said frame may serve as fixed guides for cables to be installed permitting elimination of said snatch block guides 6. Pulley-supporting frames having two pulleys are shown here, see FIG. 4, but any desired number of cables 7 may be strung simultaneously by this method utilizing frames 9 having one pulley 10 for each cable to be installed. The pulleys should be in the spaced interrelation on the frame desired to be maintained between cables in the completed cable installation, and should be of the snatch or open-topped type to permit positioning of the cables 7 thereon without disconnecting said cables from the trolley 5. FIG. 4 illustrates a suitable pulley-supporting frame 9 having two pulleys 10, spaced and supported by arms 10a in an open-topped position to receive the cables 7. Hooks 9a serve to provide means for slidably attaching the frame to the messenger.

The trolley is then connected to the forward frame in said sequence and the frames are successively interconnected with lengths 12a of relatively small diameter rope, the length of each connecting rope being equal to the interval on the messenger desired between adjacent hanger clamps 11 in the finished cable installation. The preferred method of accomplishing this interconnection of frames comprises stretching a length of rope 12 between adjacent line poles for measuring the pole-to-pole messenger span, dividing said span to determine the spacing necessary to accommodate the desired number of hanger clamps 11 at equal intervals along the messenger between said poles, marking the prospective location of said hanger clamps on the rope with tape, and fastening snap-rings 13 or other convenient frame-gripping means thereto at the tape locations. This rope 12 may then be used to interconnect a sequence of pulley-supporting frames at ground level, which sequence is then lifted to the messenger, or may be used to interconnect a sequence of frames already individually suspended from the messenger. Alternatively, lengths of rope having snap-rings at either end thereof may be prepared of a length equal to the interval desired between hanger clamps 11 when strung along the messenger, and one of said lengths may be used to connect each frame to the next frame in said sequence. Preferably each snap-ring 13 grips one frame 9 in the sequence close to the slidable attachment of said frame to the messenger 4.

The length of rope 14 used to connect the trolley to the forward frame may be any desired length but is, most conveniently, slightly longer than the longest expected interval between sucessive frames when strung along the messenger. This rope 14 should have a snap-ring 15 attached at either end thereof.

A lead rope 16 is then attached to the forward side of said trolley. This stage in the method of cable installation provided by this invention is shown in FIG. 1. Preferably, but not necessarily, the trolley lead rope 16 is fed through a snatch block 17 affixed to the overhead means at the overhead operating level forward of the pole-to-pole messenger span to be strung.

Figure 2:
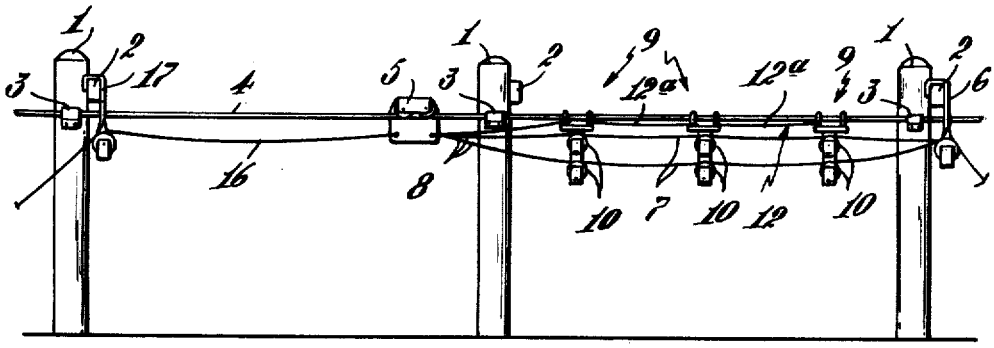
FIG. 2 is a side elevation of a cable line showing the cables and pulley-supporting frames strung along the messenger.

The rope 16 is then pulled from the ground level, preferably through the snatch block 17, simultaneously advancing the trolley to the second pole, drawing each cable 7 from its respective reel, stringing said cables 7 along the messenger 4, and spreading said frames 9 along the messenger intermediate the poles at intervals determined by the lengths 12a of frame-connecting rope 12. The trolley is then hand-lifted from the messenger and replaced thereon forward of the second pole. This stage in the method of cable installation provided by this invention is shown in FIG. 2.

A second sequence of pulley-supporting frames 9a appropriately interconnected by lengths of rope 12b adapted for spacing said frames along the second pole-to-pole messenger span is slidably attached to the messenger between the trolley 5 and said second pole, and each cable 7 attached to the trolley is laid over a matching pulley 10a of each frame of said second sequence precisely as noted above. The trolley-connecting rope 14 is disconnected from the first frame sequence and connected to the second frame sequence. The trolley lead rope is then pulled to advance the trolley for stringing cables to the third pole precisely as noted above.

Figure 3:
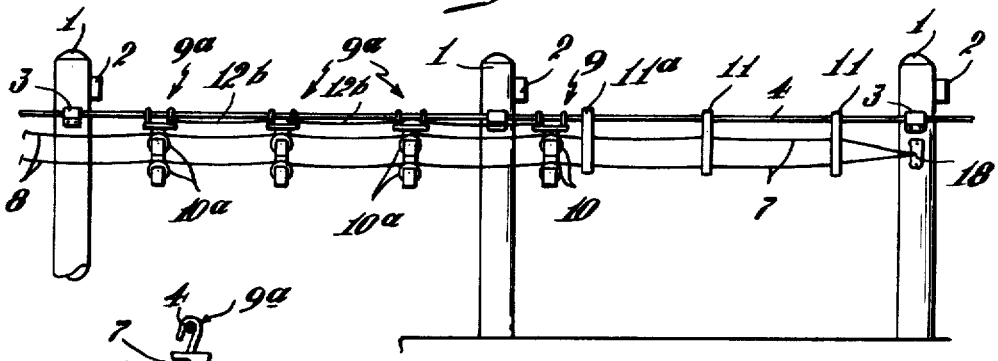
FIG. 3 is a side elevation of a cable line showing the cables tensioned and the pulley-supporting frames partially replaced with permanent cable hanger clamps.

This process of simultaneously spreading pulleys along the messenger and of stringing cables over said pulleys may be repeated the desired number of times. Then the cables 7 should be dead-ended at the first pole to insulators 18 and should be tensioned from the forward ends thereof. This will sag all cables equally and will distribute said sag between successive pulleys in proportion to pulley spacing as is shown in FIG. 3. The cable so tensioned in one operation may extend over one or more pole-to-pole messenger spans as desired, assuring equal tension between adjacent hanger clamps in the finished installation and greatly reducing the time, labor and expense required for installing and tensioning said cables. The tensioned cables should then be anchored at the overhead operating level at the forward ends thereof leaving sufficient slack at said forward ends for splicing to the next cable lengths to be installed in the cable line.

Cable hanger clamps 11 may now be suspended from the messenger closely adjacent the cable-supporting frames 9 to receive and permanently support the cables as tensioned. As each clamp 11 is attached to the messenger and cables, the respective pulley frame 9 may be removed, obviating further climbs to the operating level to remove said frames. FIG. 3 illustrates the replacing of frame pulleys with permanent cable hanger clamps, phantom lines 11a showing the position relative to the pulley-supporting frames in which hanger clamps are to be fastened.

It will be noted that in this method of cable installation, the spacing of pulley-supporting frames along an entire pole-to-pole span, and the stringing of a plurality of cables over the pulleys of said frames may be easily accomplished from a single location at the overhead operating level, therefore requiring but a single climb to said operating level preparatory to simultaneous tensioning of said cables for each pole-to-pole cable span to be installed. Thereafter, after tensioning of said cables, a single climb to the location of each pulley-supporting frame suffices to attach a permanent cable hanger clamp to the messenger and cables and to remove said pulley supporting frame.

It should be understood that the present disclosure is for the purpose of illustration only and that this invention includes all modifications and equivalents which fall within the scope of the appended claims.

I claim:

1. In overhead installation of a cable which is to be supported during tensioning thereof by pulleys suspended from and spaced along a messenger mounted on poles, the method of installation which comprises slidably attaching a sequence of pulley-supporting frames to said messenger adjacent a pole, said frames being connected in succession by means extensible to predetermined lengths totaling the approximate distance to the next pole, stringing a cable to be installed over said frame pulleys and attaching said cable to a lead rope which is connected to said frame sequence in advance thereof, and advancing said lead rope lengthwise of said messenger, whereby said frame-connecting means are extended, spacing said frames along said messenger, and said cable is strung along said messenger supported by said frame pulleys, the cable being freely movable over said pulleys so that it may be strung continuously between successive pulleys and sagged uniformly from end to end when stringing is completed, and then replacing said frames with hangers and removing the frames.

2. The method according to claim 1 further characterized by supporting a snatch block in advance of said frame sequence and guiding the cable to said frame pulleys through the snatch block.

3. The method according to claim 2 further characterized by mounting a trolley on said messenger between said lead rope and said cable and frame sequence and advancing the trolley by pulling the lead rope from the ground.

4. The method according to claim 1 further characterized by tensioning the cable to make the sag between frames proportional to said lengths.

*5. The method of installation of an overhead cable by means of a pole-supported messenger, comprising disposing pulley-supporting frames at intervals along the messenger by detachably applying the frames to the messenger and pulling them along the messenger while they are interconnected by a spacing line adapted to locate the frames at a plurality of intervals along said line totaling the approximate length to be occupied by a portion of the strung cable, stringing a cable lengthwise of the messenger over the pulleys of said frame and supported by said pulleys, then after the cable is strung along the messenger and while supported by and freely movable over the pulleys, allowing the sag of the cable to distribute between the various pulleys, and then replacing said frames with hangers and removing the frames, the method including the operation of detachably attaching the frames to said line at said plurality of intervals.*

*6. In overhead installation of a cable which is to be supported during tensioning thereof by pulleys suspended from and spaced along a messenger mounted on poles, the method of installation which comprises movably mounting a sequence of pulley-supporting frames on said*

*messenger, marking a line at predetermined intervals, stretching the line along the messenger, attaching a frame to said line at each of said marked intervals, stringing a cable to be installed over said frame pulleys and attaching said cable to a lead rope which is connected to said frame sequence in advance thereof, and advancing said lead rope lengthwise of said messenger, whereby said frames are extended in spaced relation along said messenger at said predetermined intervals and said cable is strung along said messenger supported by said frame pulleys, the cable being freely movable over said pulleys so that it may be sagged uniformly from end to end when*

*stringing is completed, and then replacing said frames with hangers and removing the frames.*

References Cited in the file of this patent or the original patent

UNITED STATES PATENTS

| | | |
|---|---|---|
| 581,242 | Viele | Apr. 20, 1897 |
| 816,991 | McNeil | Apr. 3, 1906 |
| 825,070 | Peirce | July 3, 1906 |
| 1,438,329 | Pleister | Dec. 12, 1922 |
| 2,767,742 | Channell | Oct. 23, 1956 |
| 2,878,498 | Gollnow | Mar. 24, 1959 |